United States Patent [19]

Denton

[11] Patent Number: 4,830,150

[45] Date of Patent: May 16, 1989

[54] BRAKE DRUM COOLING, DRYING AND CLEANING FINS

[76] Inventor: Lynn Denton, 3502 10th Ave., Council Bluffs, Iowa 51501

[21] Appl. No.: 14,834

[22] Filed: Feb. 13, 1987

Related U.S. Application Data

[63] Continuation-in-part of Ser. No. 833,541, Feb. 27, 1986, Pat. No. 4,674,606.

[51] Int. Cl.⁴ .................. F16D 65/10; F16D 65/827
[52] U.S. Cl. ........................ 188/218 R; 188/264 R; 192/113 A
[58] Field of Search ............ 188/264 R, 218 R; 192/113 A

[56] References Cited

U.S. PATENT DOCUMENTS

| | | | |
|---|---|---|---|
| 1,750,673 | 3/1930 | La Brie | 188/264 R |
| 1,828,972 | 10/1931 | La Brie | 188/264 R |
| 1,847,319 | 3/1932 | Wentworth | 188/264 R |
| 1,912,789 | 6/1933 | Norton | 188/264 R X |
| 1,966,169 | 7/1934 | Forbes | 188/264 R |
| 2,393,032 | 1/1946 | Eksergian | 188/264 R X |
| 2,940,794 | 6/1960 | Murphy et al. | 188/264 R |
| 3,023,858 | 3/1962 | Yocom | 188/264 R |
| 3,042,452 | 7/1962 | Bly et al. | 188/264 R X |
| 3,127,959 | 4/1964 | Wengrowski | 188/264 R |

FOREIGN PATENT DOCUMENTS

| | | | |
|---|---|---|---|
| 134667 | 9/1933 | Austria | 188/264 R |
| 481521 | 8/1929 | Fed. Rep. of Germany | 188/264 R |
| 1031814 | 3/1953 | France | 188/264 R |
| 1099546 | 3/1955 | France | 188/264 R |
| 1226608 | 2/1960 | France | 188/264 R |
| 148936 | 8/1931 | Switzerland | 188/264 R |
| 229889 | 3/1925 | United Kingdom | 188/264 R |

*Primary Examiner*—George E. A. Halvosa
*Attorney, Agent, or Firm*—Zarley McKee, Thomte, Voorhees & Sease

[57] ABSTRACT

An elongated generally frusto-conical strip having spaced-apart fins formed thereon is adapted for installation within the brake drum of a heavy duty truck for creating a rush of cooling, drying and cleansing air across the braking surface of the drum in response to rotation of the drum. The strip is installed against the interior surface of the drum exterior wall adjacent the outer periphery thereof and is secured in place by the drum mounting studs or other threaded fasteners inserted through strip mounting holes in radially inward extensions of the strip upon alignment of those holes with the drum mounting holes. An improved brake drum for heavy duty trucks has cooling, drying and cleaning fins integrally formed in the interior surface of a frusto-conical shaped outer portion of the exterior wall of the drum with the fins arranged in spaced relation from the machined braking surface to protect them from contact with the brake shoe.

5 Claims, 3 Drawing Sheets

BRAKE DRUM COOLING, DRYING AND CLEANING FINS

CROSS-REFERENCE TO RELATED APPLICATION

This application is a continuation-in-part of parent application Ser. No. 833,541 filed Feb. 27, 1986, now U.S. Pat. No. 4,674,606.

BACKGROUND OF THE INVENTION

The present invention is directed generally to a series of fins arranged within a brake drum for cooling, drying and cleaning the drum in response to rotation of the drum. The invention is particularly directed to fins for cleaning the brake drums of heavy-duty trucks on every r.p.m.

Approximately eighty percent of the accidents involving the big 18-wheel tractor-trailer trucks are caused by wet brakes. To dry their brakes, truckers can power brake (drive with the left foot on the brake pedal) but this results in significant wear of the brake shoes and drums. Mechanical shields have been proposed to keep the brakes dry but these cut off air circulation and make the brakes and wheel bearings run much hotter. Custom brake drums have been proposed including means for directing air exteriorly into the space between the wheel and brake drum but these are positioned radially away from the braking surfaces and operate to attract moisture along with the air.

Truckers going down a mountain put the brakes on and never release them. The powder coming off the brake lining stays between the brake shoes. If the brakes are released, the powder flies around the drum by centrifugal force. When the brakes are reapplied, the shoes hit the powder which then becomes a grinding compound creating heat and brake failure. The addition of rain or snow exaggerates the problem. Clean brakes are a necessity.

One solution proposed by this inventor and disclosed in his U.S. Pat. No. 4,621,715 was to provide an elongated flexible strip adapted to be wrapped around the peripheral wall of a brake drum adjacent the free interior edge thereof. A row of fins connected to the strip extended radially inwardly therefrom at a position adjacent to and interiorly of the interior edge of the brake drum to create a suction and effect a rush of air interiorly away from the brake drum both to dissipate moisture and foreign objects on the braking surface at every r.p.m. as well as to prevent the entry of moisture from the ambient atmosphere. Whereas that invention has operated successfully, it has been found that other structure can accomplish substantially the same result by blowing air interiorly across the interior surface of a brake drum rather the sucking air thereacross.

Another solution proposed by this inventor and disclosed in U.S. Pat. No. 4,674,606 was to provide a circular elongated flexible strip adapted for securement within the brake drum to create a rush of dry, cooling, cleansing air across the braking surface in response to rotation of the drum. Whereas that invention has likewise operated successfully, the inventor has developed an improved securement means for such a strip which requires no tapping of holes or other modification of the drum itself.

Whereas integral fins formed within a brake drum have been suggested as in Forbes U.S. Pat. No. 1,966,169, such fins are believed to have been impractical and/or inoperative for the reason that a dangerous grinding of metal would occur upon shifting movement of a brake shoe against the rotating fins.

A primary object of the invention therefore is to provide improved fins for cooling, drying and cleaning the brake drums of heavy-duty trucks at every r.p.m.

Another object is to provide such an apparatus for brake drums which is visually concealed and positioned so as not to interfere with inspection of or access to the brakes of a truck.

Another object is to provide such an apparatus readily suited for use with single or multiple axle vehicles and trailers.

Another object is to provide a circular strip having coolng, drying and cleaning fins formed thereon, which strip may be readily installed on conventional brake drums without modification of the drum itself.

Another object is to provide a brake drum having cooling, drying and cleaning fins integrally formed therein which are of a shape and position to cause a rush of air across the braking surface of the drum yet which are protected from engagement with a laterally shifting brake shoe within the drum.

Finally, an object is to provide an apparatus including such cooling, drying and cleaning fins, which apparatus is economical to manufacture, easy to install and efficient in operation.

SUMMARY OF THE INVENTION

The present invention is directed to an improved circular strip of cooling fins adapted for installation within the brake drum of a heavy-duty truck or the like for creating a rush of cooling, drying and cleansing air across the braking surface of the drum in response to rotation of the drum. The strip is formed for installation against the interior surface of the brake drum exterior wall adjacent the outer periphery thereof. No tapping of holes or other modification of the drum is required to secure the finned strip in place since the strip includes a plurality of radially inwardly extending tabs having holes adapted for alignment with the mounting holes of the drum. Accordingly, the finned strip is positively secured within the drum by the same threaded fasteners which mount the drum on a hub.

The invention is furthermore directed to an improved brake drum for heavy-duty trucks and the like, which drum includes a plurality of integrally formed drying, cooling and cleaning fins arranged on the interior surface of the brake drum exterior wall adjacent the outer periphery thereof. The exterior wall has a frustoconical shaped outer portion engaging the generally cylindrical wall which has the machined braking surface on the interior surface thereof. The fins are formed on the interior surface of the frustoconical shaped outer portion and are of a shape and position to effect a rush of drying, cooling and cleaning air across the machined braking surface in response to rotation of the drum. The fins are also designed in spaced relation from both the machined braking surface and the machined bolting surface on the interior of the drum so as to be protected from contact with a laterally shifting brake shoe within the drum and to prevent interference with the machining of the various machined surfaces of the drum.

Since truck weights and lengths have been greatly increased while still using the same brakes, the drying, cooling and cleaning fins of the present invention are critically needed. These fins can be adapted for trucks, cars, school buses or any vehicle with drum brakes.

DETAILED DESCRIPTION OF THE PREFERRED EMBODIMENTS

Figure 1:
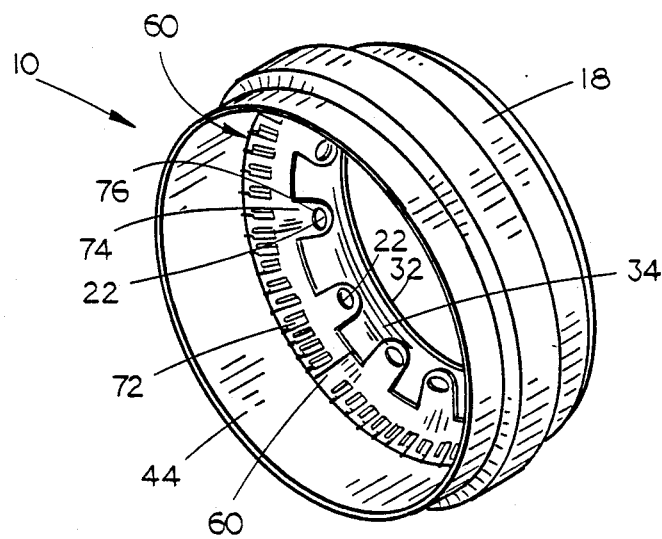
FIG. 1 is a perspective view of a brake drum including the finned strip of the invention.
Figure 6:
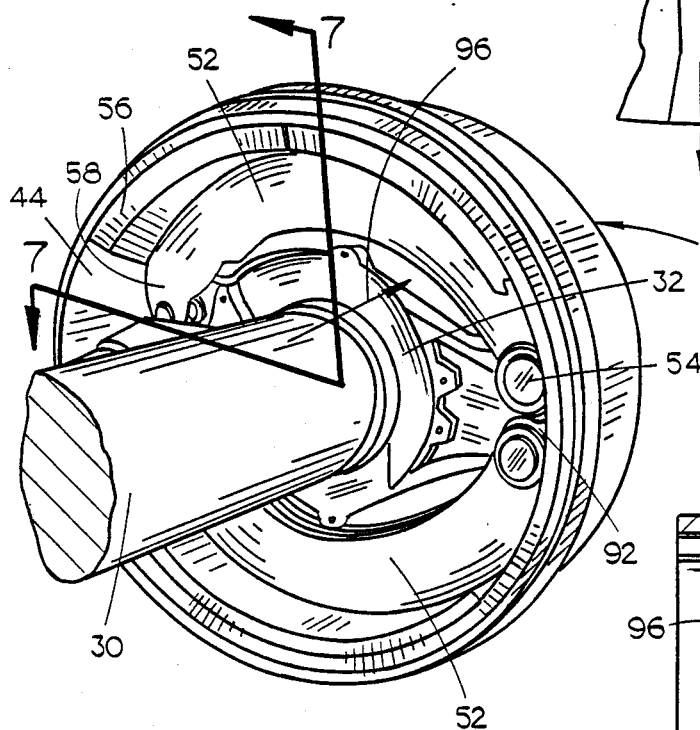
FIG. 6 is a perspective view of a brake drum installed on a vehicle axle assembly.
Figure 7:
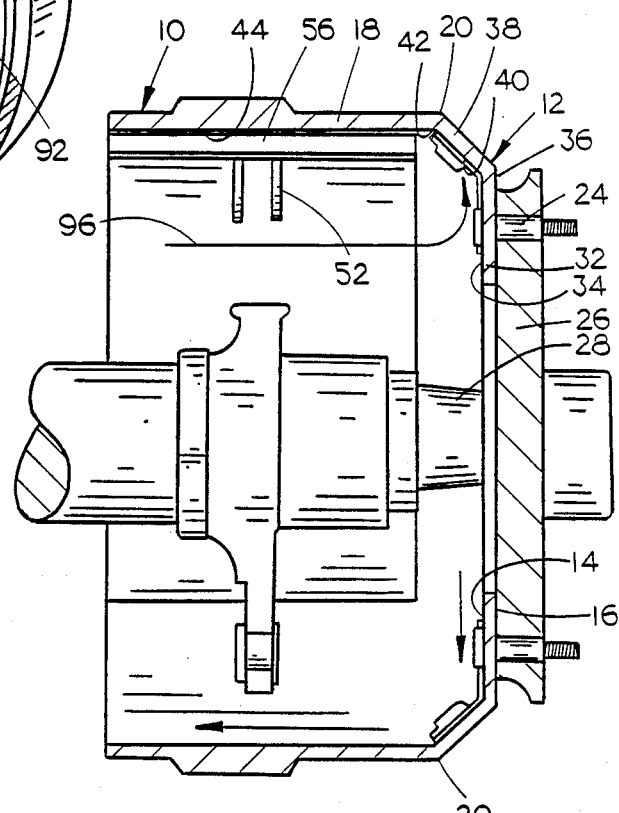
FIG. 7 is a sectional view of the installed brake drum and finned strip.
Figure 8:
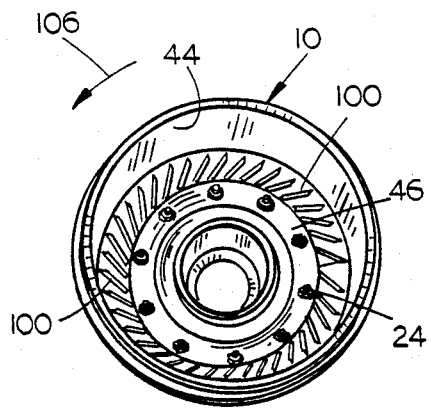
FIG. 8 is a perspective view of an alternate brake drum including integral cooling fins formed therein.
Figure 9:
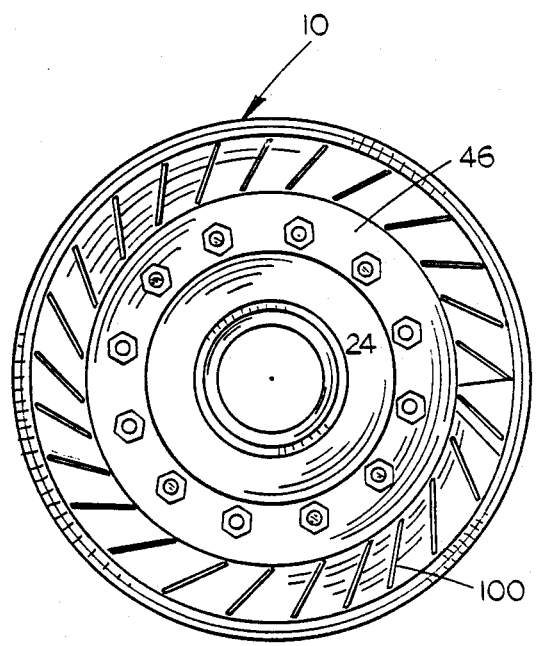
FIG. 9 is an enlarged elevational view of the drum of FIG. 8.

FIGS. 1, 6 and 7 show a conventional truck brake drum 10 including a generally upright exterior wall 12 having interior and exterior surfaces 14 and 16 respectively and a generally cylindrical wall 18 extended interiorly from the outer periphery 20 of the exterior wall 12. The exterior wall 12 has ten drum mounting holes 22 through which studs 24 or other threaded fasteners are extended for mounting the brake drum on a wheel supporting hub 26. The hub is rotatably mounted on axle 28 which protrudes exteriorly from the stationary axle sleeve 30 on which the brake assembly 32 is mounted.

The drum exterior wall 12 includes a radially extended generally planar inner portion 32 having interior and exterior surfaces 34 and 36, and a frustoconical shaped outer portion 38 inclined outwardly and interiorly from the inner portion 32 and having an interior surface 40 which terminates in an outer annular edge 42 defining the junction between exterior wall 12 and cylindrical wall 18.

The inner surface of cylindrical wall 18 shall be referred to as the first machined surface 44. This, of course, is the surface engaged by the brake shoes for stopping the vehicle. The drum has a second machined surface 46 on the interior surface 34 of the inner portion 32 of exterior wall 12. A third machined surface is presented on the exterior surface 36 of the inner portion 32 of exterior wall 12. These surfaces are machined so as to be precisely positioned relative to one another to ensure that the drum is concentrically disposed with the hub and axle onto which it is mounted.

As shown in FIGS. 6 and 7, the brake assembly 50 includes a pair of shoes 52 which are pivotally mounted at adjacent ends 54 and which carry the brake linings 56. Upon actuation of the brakes, the opposite ends 58 of the shoes are forced apart urging the linings against the first machined surface 44 of the brake drum to stop the vehicle. Substantial heat is generated by constant braking. That heat is partially dissipated by the cooling fins of the invention.

Figure 2:
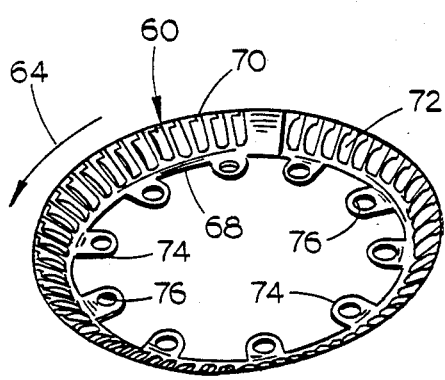
FIG. 2 is a perspective view of a finned strip adapted for installation on the drums on the left side of a vehicle.

The generally circular elongated flexible strip 60 of the invention is shown in FIG. 1 installed within the brake drum 10. FIG. 2 shows the strip 60 alone with the opposite ends drawn together in overlapping relation to impart a frusto-conical shape to the strip so that the exterior surface 62 of the strip exactly corresponds to the interior surface 40 of the drum frusto-conical outer portion 38.

Figure 3:
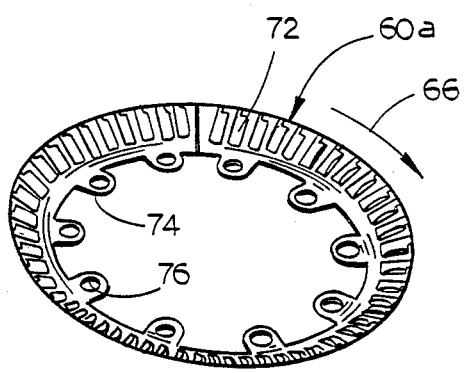
FIG. 3 is a perspective view of a finned strip adapted for installation on the wheels on the right side of a vehicle.

Whereas strip 60 of FIG. 2 is adapted for installation on a wheel on the left side of a vehicle for rotation in the direction of arrow 64, FIG. 3 shows a strip 60a which is constructed as the mirror image of strip 60 for installation on a drum on the right side of a vehicle for rotation in the direction of arrow 66. This description will be directed to the strip 60 with the understanding that like numerals refer to like parts of each.

Strip 60 has radially spaced apart inner and outer edges 68 and 70. Each strip has a plurality of fins 72 formed therein for causing airflow outwardly across the first machined surface 44 of a drum on which the strip 60 is installed.

To secure the strip 60 to the drum 10, each strip includes a plurality of tabs 74 protruding radially inwardly from the inner edge 68 of the strip 60. The tabs are of a size and position to overlie the drum mounting holes 22 and each tab 74 includes a strip mounting hole 76 which is alignable with the corresponding drum mounting hole for receiving the same threaded fastener 24 used for securing the drum 10 to the hub 26.

The tabs 74 are inclined relative to the strip 60 so as to be arranged in a common plane when the strip takes on its installed frusto-conical shape.

Whereas the tabs 74 will secure the opposite ends of the strip 60 in the desired overlapped relation when the strip is installed in a drum 10, separate fasteners such as rivets or the like may be used for maintaining the ends of the strips in such overlapped relation at all times.

Figure 4:
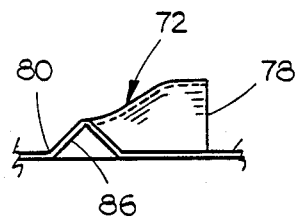
FIG. 4 is an enlarged partial elevational view of one of the cooling fins.
Figure 5:
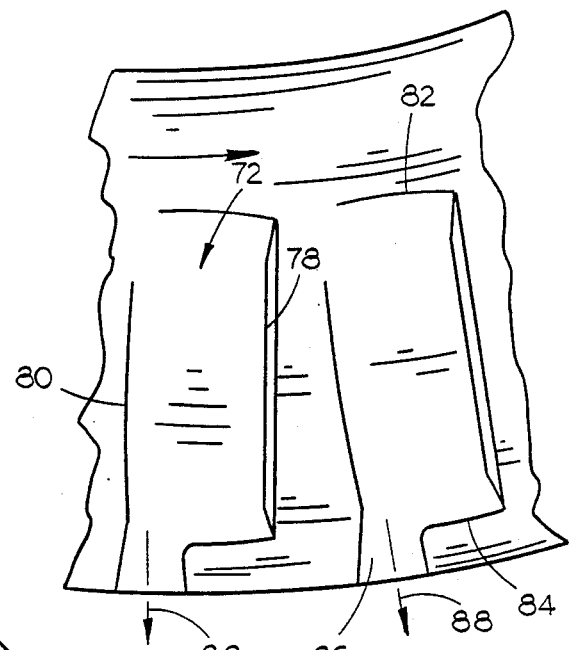
FIG. 5 is an enlarged top plan view of cooling fins of the invention.

A preferred shape for the fins 72 is illustrated in FIGS. 4 and 5. Each fin 72 includes a raised socket-defining projection having an open leading side 78, a closed trailing side 80 attached to the strip 60 and inner and outer ends 82 and 84. At least the trailing end of outer end 84 is open by a raised passageway 86 for exhausting collected air as indicated by arrows 88 in response to rotation of the strip 60 in the direction of arrow 90. The size and shape of the fins 72 are not critical to the present invention but the illustrated shape is preferred for the venturi effect which directs high velocity air toward and across the first machined surface 44 of the brake drum 10.

In operation, referring to FIG. 6, some of the air which is directed interiorly from the fins 72 impinges upon the brake shoes 52 and linings 56. However, there is an approximately ⅜ inch spacing 92 between the adjacent ends 54 of the brake shoes and an approximately 10 inch wide space between the opposite ends 58 of the brake shoes. There is also an approximately 1/16 inch gap between the linings 56 and drum when the brakes are not being applied. The air which rushes out through these spaces creates a suction which draws air into the brake drum between the shoes 52 and axle sleeve 30, as indicated by arrows 96 in FIGS. 6 and 7. Thus, the constant air flow across the brake surfaces 44 when the truck is moving dissipates heat and moisture and cleans the drum of any dust buildup.

An alternate form of the invention is illustrated in FIGS. 8-12. Because the drum of this embodiment is identical to the drum described in FIGS. 1-7 but for the inclusion of integrally molded fins therein, like reference numerals will be used to refer to like parts of both drums.

In this drum 10, the drying, cooling and cleaning fins 100 are integrally formed as part of the drum and are arranged in circumferentially spaced relation on the interior surface 40 of the frusto-conical shaped outer portion 38 of exterior wall 12. Each fin has inner and outer ends 102 and 104.

Figure 10:
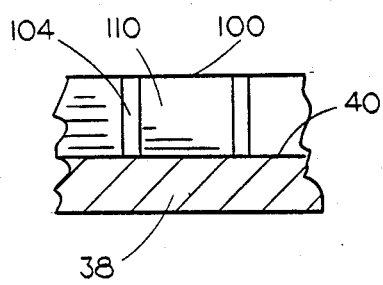
FIG. 10 is a further enlarged detail sectional end view of one of the integrally formed fins.
Figure 11:
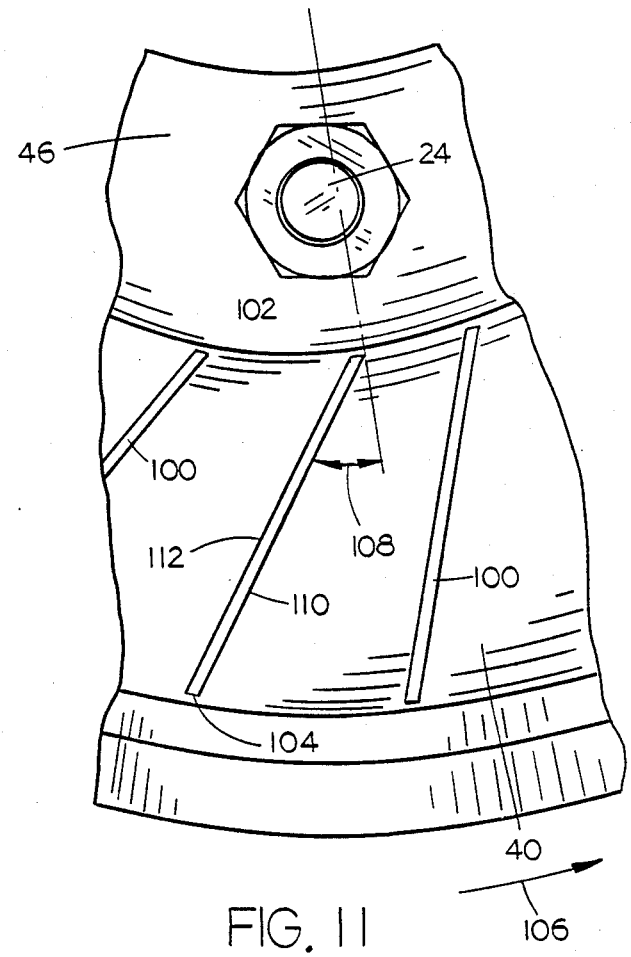
FIG. 11 is an enlarged partial elevational view of a portion of the finned drum.

As shown in FIG. 10, the fins 100 protrude axially outwardly from the drum surface 40 to facilitate removal of the drum from the mold in which it is made. The fins 100 are disposed at an incline however, so that the outer end 104 is circumferentially disposed behind the inner end 102 in the direction of rotation of the drum, as indicated by arrow 106. Each fin is inclined at an approximately 45° angle to a radial line through the inner end 102 thereof as indicated by arrow 108 in FIG. 11. Each fin may be seen as having a leading side 110 and a trailing side 112. The inner end 102 of each fin is generally radially aligned with the outer end 104 of an adjacent fin.

Figure 12:
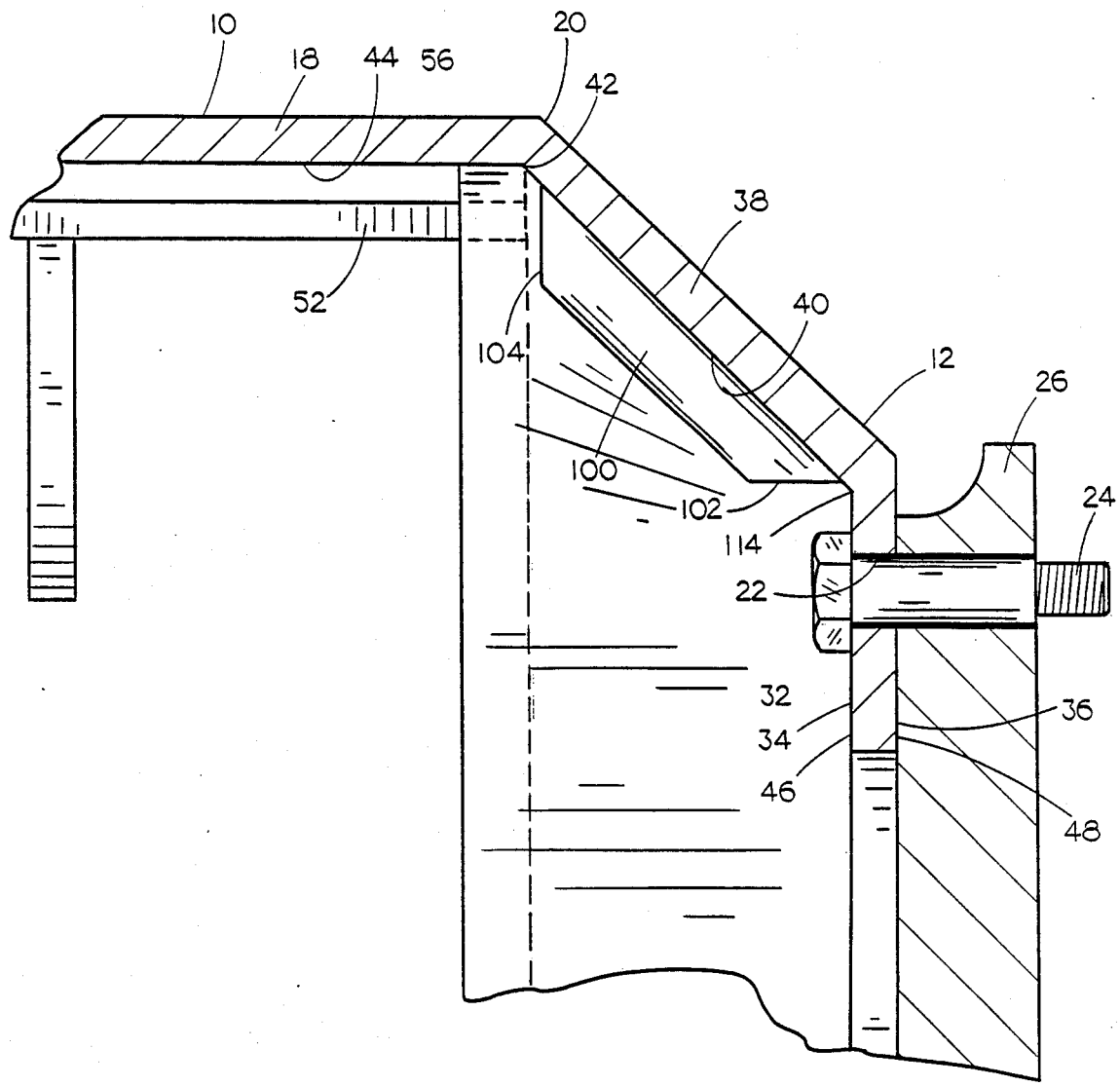
FIG. 12 is an enlarged side sectional view of a portion of the finned drum of the invention.

Whereas the precise angle and height of the fins 100 is not critical to the present invention, the longitudinal extent and position of the ends of the fins are important features. The outer end 104 of each fin 100 is spaced exteriorly from the outer annular edge 42 of the frusto-conical outer portion 38 of the drum exterior wall 12. The extent of the spacing need not be as great as shown in FIG. 12 and may be as little as 0.001 inches. The space is important for protecting the fins from engagement with a brake shoe 52 or its lining 56 in response to exteriorly directed lateral shifting movement of the brake shoe to the dotted line position indicated in FIG. 12. At that position, the shoe abuts with the outer portion 38 of exterior wall 12 at the outer annular edge 42. The exterior spacing of the fin from that edge maintains the fins in clearance relation from the brake shoes even if the shoes are moved to the exterior limit position thereof by tiny grooves in the lining or braking surface of the drum which act like threads to cause lateral shifting of the shoe.

The opposite inner end 102 of each fin 100 extends radially inwardly no further than the inner annular edge 114 of the interior surface 40 of the frusto-conical outer portion 38 of exterior wall 12. Like the outer end 104 of each fin 100, the inner end 102 is preferably spaced radially outwardly from inner annular edge 114, as shown in FIG. 12.

A preferred shape for the fins 100 is shown in FIGS. 8-12 wherein the outer end 104 is disposed generally parallel to a radial line through said outer end and the inner end 102 is disposed generally parallel to the axis of the drum.

Whereas the invention has been shown and described in connection with preferred embodiments thereof, it is understood that many additions, modifications and substitutions may be made which are within the intended scope of the appended claims. For example, whereas the strip mounting holes in the embodiments of FIGS. 2 and 3 are disposed in radially inwardly directed tabs 74, the spacing between tabs could be completely filled in to define a continuous annular flange in which the strip mounting holes are formed.

Clean brakes are necessary for maximizing brake life and for insuring stopping power, and therefore safety, in all driving situations. The cooling, drying and cleaning fins of this invention work at every r.p.m. to effect a rush of air across the braking surfaces of the drums. Any powder or foreign objects which enter the drum are blown out before the wheel makes another full revolution, thereby maintaining a clean braking surface for maximum stopping efficiency at all times.

Thus, there has been shown and described brake drum cooling, drying and cleaning fins which accomplish at least all of the stated objects.

I claim:

1. An apparatus for drying, cooling and cleaning a brake drum including a generally upright annular wall having interior and exterior surfaces and a generally cylindrical wall extended interiorly from the outer periphery of the upright wall, said upright wall having a frustoconical shaped outer portion engaging the generally cylindrical wall and a plurality of drum mounting holes arranged in spaced relation radially inwardly from said frustoconical shaped outer portion and in circumferentially spaced relation thereon for securing said drum to a hub by threaded fasteners, said apparatus comprising, a generally circular elongated flexible strip having radially spaced apart inner and outer edges, said elongated flexible strip being formable into a frustoconical shape adapted for engagement against a matching surface of said frustoconical shaped outer portion of said upright wall, securement means for securing said strip on the interior surface of said frustoconical shaped outer portion of said upright wall adjacent said cylindrical wall, said strip including a plurality of fins arranged in circumferentially spaced relation thereon and so shaped and positioned to extend substantially across said frustoconical shaped outer portion upon securement of said strip thereon for causing air flow generally radially outwardly from said fins toward said cylindrical wall in response to rotation of the brake drum in one direction, said securement means including a plurality of tabs protruding radially inwardly from said inner edge of said flexible strip, said tabs being inclined relative to said flexible strip so as to lie in a common plane upon securement of said strip to said frustoconical shaped outer portion and said tabs being of a size and position to overlie said drum mounting holes and said tabs each including a strip mounting hole alignable with a respective drum mounting hole for securement of the strip to the drum by the same threaded fasteners for mounting the drum on a hub.

2. The apparatus of claim 2 wherein the number of tabs corresponds to the number of drum mounting holes in said brake drum.

3. The apparatus of claim 1 wherein each fin comprises a raised socket defining a projection having an open leading side, with reference to rotation in said one direction, for collecting air and inner and outer ends, the outer end being at least partially open for exhausting collected air in response to rotation of the strip in said one direction.

4. The apparatus of claim 3 wherein said outer end has leading and trailing ends with respect to rotation in said one direction, said leading end contacting the strip to prevent air flow therethrough and said trailing end defining an opening for passage of air therethrough.

5. The apparatus of claim 3 wherein said fins extend transversely of said strip along a generally true radial inclination thereon.

* * * * *